Figure 1:
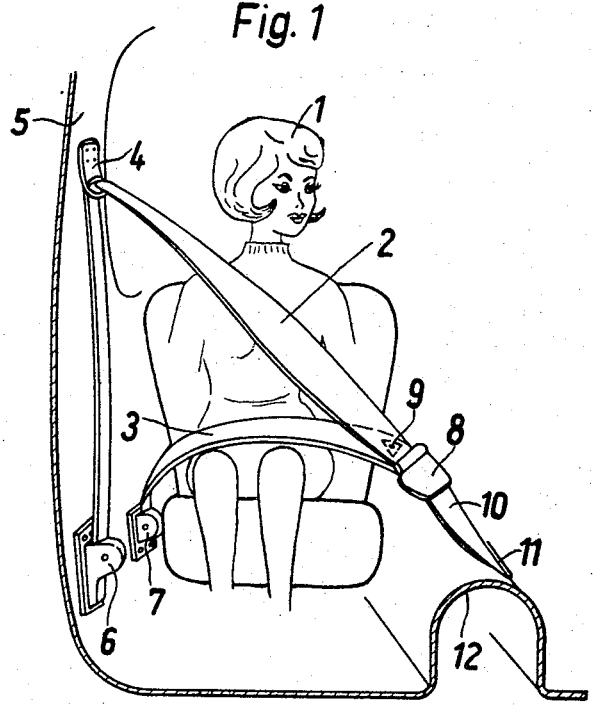

Oct. 24, 1967 PER-OLAF WEMAN 3,348,881
FASTENING MEANS FOR A THREE-POINT SAFETY
BELT, PARTICULARLY FOR MOTOR VEHICLES
Filed Nov. 16, 1966

Inventor:
PER-OLAF WEMAN
By Lowry & Rinehart
ATTYS.

United States Patent Office 3,348,881
Patented Oct. 24, 1967

3,348,881
FASTENING MEANS FOR A THREE-POINT SAFETY BELT, PARTICULARLY FOR MOTOR VEHICLES
Per-Olaf Weman, Hamburg-Garstedt, Germany, assignor to Sigmatex A.G., Basel, Switzerland, a firm
Filed Nov. 16, 1966, Ser. No. 594,798
Claims priority, application Germany, Nov. 26, 1965, S 100,672
10 Claims. (Cl. 297—388)

This invention relates to fastening means for a three-point safety belt, particularly for use in motor vehicles, which three-point safety belt consists of a shoulder belt extending from a self-retracting belt winder substantially diagonally to the upper part of a user's body and of a hip belt extending substantially transversely of the upper part of the user's body, the hip belt being adapted to be fastened on both sides of the user near the floor of the vehicle.

In the known three-point safety belts of this kind the end of the shoulder belt opposite a loop fixed to a wall of the vehicle has to be passed through a belt buckle and then led back as a hip belt to the other side of the user, in order to be fastened there to the floor of the vehicle. This type of three-point safety belt makes it difficult to properly adjust the two belt lengths, since these are depending on each other. This is disadvantageous insofar as the use of belt winders in such three-point safety belts does not securely prevent the hip belt from cutting into the user's soft parts in the case of an accident. Another disadvantage consists in that when the three-point safety belt is used at ease the hip belt may be dangerously slackened by the user's natural movements so that the three-point safety belt will fail to accomplish its proper function in an accident. Finally, the known arrangement does not meet the requirement according to which the shoulder belt, on the one hand, and the hip belt, on the other hand, should be of different elasticity.

It is the object of the present invention to provide a three-point safety belt which, irrespective of the position of the vehicle seat and of the user's physique, enables the shoulder and hip belts to be adequately adapted to the user's body and which in the case of an accident reliably holds the user in the position required for his or her invulnerability, such three-point safety belt being intended to be secured so that the hip belt and the shoulder belt may be made of materials of different extensibility.

To attain this object, the present invention provides a three-point safety belt of the initially specified type, which is characterized in that a belt winder is provided at one end of the hip belt which is independent of the self-retracting belt winder of the shoulder belt and that the lengths of the shoulder belt and the hip belt are independent of each other.

In this arrangement, the two belt winders may be so constructed as to exert a slight permanent pull when in use, as it is known per se in belt winders. However, it has proved particularly advantageous to provide for the hip belt a belt winder of known construction which is locked when the pull in the hip belt is slackened after having been pulled out, and for the shoulder belt a self-retracting belt winder adapted to automatically block the shoulder belt only in response to abrupt deceleration or vilent changes of direction, which is known per se. With a three-point safety belt being fixed in this manner, the hip belt after having been pulled out to the desired length will be blocked against being further pulled out. On the other hand, the self-retracting belt winder of the shoulder belt enables the latter in the normal use of the safety belt to be further pulled out so that the user can freely move the upper part of his or her body and easily reach, for example, the controls on the dashboard or the glove box, although the safety belt affords sufficient security against injuries in an accident, since the self-retracting belt winder will immediately be locked in such extreme conditions.

The belt winder of the hip belt may expediently be constructed so that it is manually lockable by inserting a tongue or another suitable locking means. This makes it possible to apply the hip belt independently of the shoulder belt and to obtain the same advantageous effect as above. Conversely, it is rendered possible by a development of the invention that the hip belt is provided at one end with a self-retracting belt winder fixed to the vehicle, while its other end is secured to a belt winder of the shoulder belt which forms part of a lockable belt buckle. In this arrangement, the shoulder belt may be provided with a belt winder connected with the locking member which is locked when the buckle is closed.

According to an alternative feature of the invention it is possible to provide for the hip belt a belt winder which locks after a short return movement of the hip belt. This measure gives increased safety to the user together with considerable comfort.

For an easy and expeditious fastening of the three-point safety belt it has proved to be useful to secure the ends of the shoulder belt and of the hip belt remote from the respective belt winders to a common lock member of a lockable belt buckle adapted to be unlocked by hand. In this case, however, it is provided for that these belt ends do not form part of a single belt length which runs through an opening of the locking member as in the prior art arrangements, since this would preclude the possibility of an independent length adjustment of the hip belt and the shoulder belt. On the contrary, the invention provides that the belt ends secured to the common locking member are connected with each other by sewing.

Figure 2:
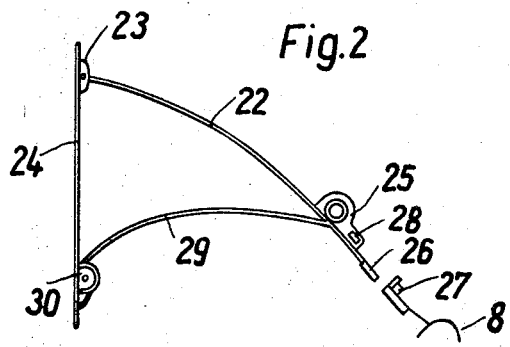

Two embodiments of the invention will now be described by way of example and with reference to the accompanying drawing, in which:

FIG. 1 is a somewhat schematical elevational view showing a three-point safety belt in use, and FIG. 2 is a similar view showing another embodiment of the invention.

FIG. 1 shows an arrangement in which for the safety of a motor vehicle front seat passenger 1 a three-point safety belt is provided which substantially consists of a shoulder belt 2 and a hip belt 3. About half the length of the shoulder belt 2 has been pulled through a loop 4 secured to an inner wall 5 of a motor vehicle. The leading end of the shoulder belt 2 is retained in a self-retracting belt winder 6 fixed to the inner surface of the wall 5 near the floor of the motor vehicle. The self-retracting belt winder 6 is so constructed that it permits the effective length of the shoulder belt 2 to be changed, e.g. lengthened by exerting a slight pull thereon, while, on the other hand, it is locked to prevent the shoulder belt 2 from being unintentionally pulled out when the vehicle is suddenly decelerated or subjected to violent changes of direction.

The hip belt 3 is provided with a different type of belt winder 7 which is fixed to the wall 5 of the vehicle in laterally spaced relation to the self-retracting belt winder 6. The belt winder 7 is so constructed that, on fastening the safety belt, the hip belt 3 can be pulled out to the desired length, but as soon as the pull on the hip belt 3 is released, even if only temporarily, the belt winder 7 is locked after a short return movement of the hip belt 3, thereby preventing the latter from being pulled out any further. Consequently, the belt winders 6 and 7 operate in such a manner that after the safety belt has been fastened by the passenger 1, the length of the hip belt 3 remains unchanged, unless the belt winder 7 is manipulated, whereas the length of the shoulder belt 2 can constantly be changed, for example, by movements of the upper part of the passenger's body. It is thus clear that the three-point safety belt affords to a user the maximum freedom of motion and, at the same time, also the maximum safety in the case of an accident.

The ends of the belts 2 and 3 remote from the belt winders 6 and 7, respectively, are connected with the push-in tongue of a belt buckle 8 which can be opened by hand, immediately behind the push-in tongue of the belt buckle 8, these ends of the belts 2 and 3 are additionally connected with each other by a seam 9. The belt buckle 8 is secured to the free end of a strap 10 the other end of which is secured to the cardan tunnel 12 by suitable fixing means 11. The strap 10 may be stiffened. When fastening the three-point safety belt it is thus sufficient to pull the push-in tongue only once and then to push it into the buckle 8, in order to obtain the proper length of both the shoulder belt 2 and the hip belt 3 without any additional adjustment.

For unfastening the three-point safety belt it is sufficient to unlock the buckle 8. The shoulder belt 2 will then be wound up by the self-retracting belt winder 6, thereby to prevent loose belt lengths from lying about in the vehicle. In addition, it is also possible to wind up the hip belt 3 by manipulating the belt winder 7.

The three-point safety belt schematically illustrated in FIG. 2 comprises a shoulder belt 22 and a hip belt 29. One end of the shoulder belt 22 is secured to a wall 24 of the vehicle by suitable fixing means 23 and the other end is connected with a belt winder 25 and provided with a tongue 26 for a belt buckle 27. When the tongue 26 is inserted in the buckle 27, the belt winder 25 is locked. For unlocking the belt winder 25, this latter is provided with manually operable unlocking means 28, thereby to enable the length of the shoulder belt 22 to be adjusted even after insertion of the tongue 26 in the buckle 27.

The hip belt 29 is provided with a belt winder 30 exerting a permanent pull on the hip belt 29 and blocking the latter when a load is suddenly applied thereto, as is the case, for example, in an accident. The other end of the hip belt 29 is connected to the tongue 26 but will not be wound up by the belt winder 25. In this embodiment, too, it is thus possible to use materials of different extensibility for the shoulder and hip belts 22 and 29, respectively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. Fastening means for a three-point safety belt, particularly for use in motor vehicles, comprising a self-retracting belt winder for a shoulder belt extending substantially diagonally to the upper part of a user's body, and means permitting a hip belt extending substantially transversely of the upper part of the user's body to be fastened on both sides of the user near the floor of the vehicle, said latter means including a belt winder provided at one end of the hip belt independently of said self-retracting belt winder for the shoulder belt and the lengths of the shoulder belt and the hip belt being independent of each other.

2. A safety belt as claimed in claim 1, wherein the belt winder for the hip belt is locked when tension is applied to the hip belt and the self-retracting belt winder for the shoulder belt automatically locks upon deceleration or a sudden change of direction of the motor vehicle.

3. A safety belt as claimed in claim 1, wherein a locking mechanism is provided for locking the belt winder for the hip belt.

4. A safety belt as claimed in claim 3, wherein a tongue is associated with the locking mechanism and the belt winder for the hip belt can be locked by inserting said tongue in the locking mechanism.

5. A safety belt as claimed in claim 1, wherein the belt winder for the hip belt is adapted to lock after a short return movement of the hip belt.

6. A safety belt as claimed in claim 1, wherein a common lock member of a lockable belt buckle adapted to be unlocked by hand is provided for the shoulder and hip belts and the ends of the shoulder and hip belts remote from the respective belt winders are secured to said common lock member.

7. A safety belt as claimed in claim 6, wherein the belt ends secured to the common lock member are connected with each other by means of a seam.

8. A safety belt as claimed in claim 7, wherein a loop is fixed to a wall of the motor vehicle and the shoulder belt is passed in a known manner through said loop.

9. A safety belt as claimed in claim 1, wherein a lockable belt buckle is provided and the belt winder provided at one end of the hip belt is a self-retracting belt winder fixed to a wall of the motor vehicle, whereas the other end of the hip belt is secured to the belt winder for the shoulder belt which forms part of the lockable belt buckle.

10. A safety belt as claimed in claim 9, wherein a lock member is associated with the belt buckle and the belt winder for the shoulder belt is connected with said lock member and adapted to lock when said lock member is inserted in the belt buckle.

References Cited

UNITED STATES PATENTS

| | | | |
|---|---|---|---|
| 3,172,701 | 3/1965 | Weman | 297—389 |
| 3,233,941 | 2/1966 | Selzer | 297—389 |
| 3,243,233 | 3/1966 | Davis | 297—389 |
| 3,258,293 | 6/1966 | Sharp | 297—389 |
| 3,286,946 | 11/1966 | Board et al. | 242—107.2 |
| 3,313,573 | 4/1967 | Smith et al. | 297—388 |
| 3,317,243 | 5/1967 | Weman | 297—389 |

CASMIR A. NUNBERG, *Primary Examiner.*